United States Patent
Zhang et al.

(10) Patent No.: US 12,423,237 B2
(45) Date of Patent: Sep. 23, 2025

(54) DATA PROCESSING NETWORK WITH SUPER HOME NODE

(71) Applicant: Arm Limited, Cambridge (GB)

(72) Inventors: Wenxuan Zhang, Austin, TX (US); Jamshed Jalal, Austin, TX (US); Mark David Werkheiser, Austin, TX (US); Sakshi Verma, Austin, TX (US); Ritukar Khanna, Austin, TX (US); Devi Sravanthi Yalamarthy, Austin, TX (US); Gurunath Ramagiri, Austin, TX (US); Mukesh Patel, Round Rock, TX (US); Tushar P Ringe, Austin, TX (US)

(73) Assignee: Arm Limited, Cambridge (GB)

( * ) Notice: Subject to any disclaimer, the term of this patent is extended or adjusted under 35 U.S.C. 154(b) by 96 days.

(21) Appl. No.: 18/109,453

(22) Filed: Feb. 14, 2023

(65) Prior Publication Data
US 2024/0273025 A1    Aug. 15, 2024

(51) Int. Cl.
*G06F 12/0831* (2016.01)
*G06F 12/0871* (2016.01)

(52) U.S. Cl.
CPC ...... *G06F 12/0833* (2013.01); *G06F 12/0871* (2013.01)

(58) Field of Classification Search
CPC ............ G06F 12/0833; G06F 12/0871; G06F 2212/1048
See application file for complete search history.

(56) References Cited

U.S. PATENT DOCUMENTS

| | | | |
|---|---|---|---|
| 6,810,467 B1* | 10/2004 | Khare | G06F 12/0828 711/146 |
| 8,296,525 B1* | 10/2012 | O'Bleness | G06F 12/0831 711/146 |
| 2003/0131201 A1* | 7/2003 | Khare | G06F 12/0831 711/119 |
| 2003/0131202 A1* | 7/2003 | Khare | G06F 12/0813 711/119 |
| 2014/0095809 A1* | 4/2014 | Moll | G06F 12/0831 711/146 |
| 2016/0188471 A1* | 6/2016 | Forrest | G06F 12/0828 711/119 |
| 2020/0403909 A1* | 12/2020 | Kleyman | G06F 13/30 |
| 2022/0164288 A1* | 5/2022 | Ramagiri | G06F 12/0815 |

FOREIGN PATENT DOCUMENTS

CN    113900968 A    1/2022

* cited by examiner

*Primary Examiner* — Francisco A Grullon
(74) *Attorney, Agent, or Firm* — Leveque Intellectual Property Law, P.C.

(57) ABSTRACT

A super home node of a first chip of a multi-chip data processing system manages coherence for both local and remote cache lines accessed by local caching agents and local cache lines accessed by caching agents of one or more second chips. Both local and remote cache lines are stored in a shared cache, and requests are stored in shared point-of-coherency queue. An entry in a snoop filter table of the super home node includes a presence vector that indicates the presence of a remote cache line at specific caching agents of the first chip or the presence of a local cache line at specific caching agents of the first chip and any caching agent of the second chip. All caching agents of the second chip are represented as a single caching agent in the presence vector.

10 Claims, 5 Drawing Sheets

DATA PROCESSING NETWORK WITH SUPER HOME NODE

BACKGROUND

In large, multi-chip data processing systems with many caching agents, it is challenging to track the presence of a cache line at all caching agents. Tracking is usually done by storing an entry for each cache line in a snoop filter table, with each entry containing a list of multi-bit device identifiers (IDs) or a single bit logical ID indirection for each caching agent to indicate which caching agents the cache line is present at. This approach is not practical for large scale systems since the snoop filter table becomes too large. For example, in a system with 512 caching agents being tracked, it is not practical to store each caching agent's identifier in each cache line entry in the snoop filter table. Even with a logical ID indirection for each caching agent, a 512-bit presence vector would be required for each cache line.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding or analogous elements.

DETAILED DESCRIPTION

Figure 1:
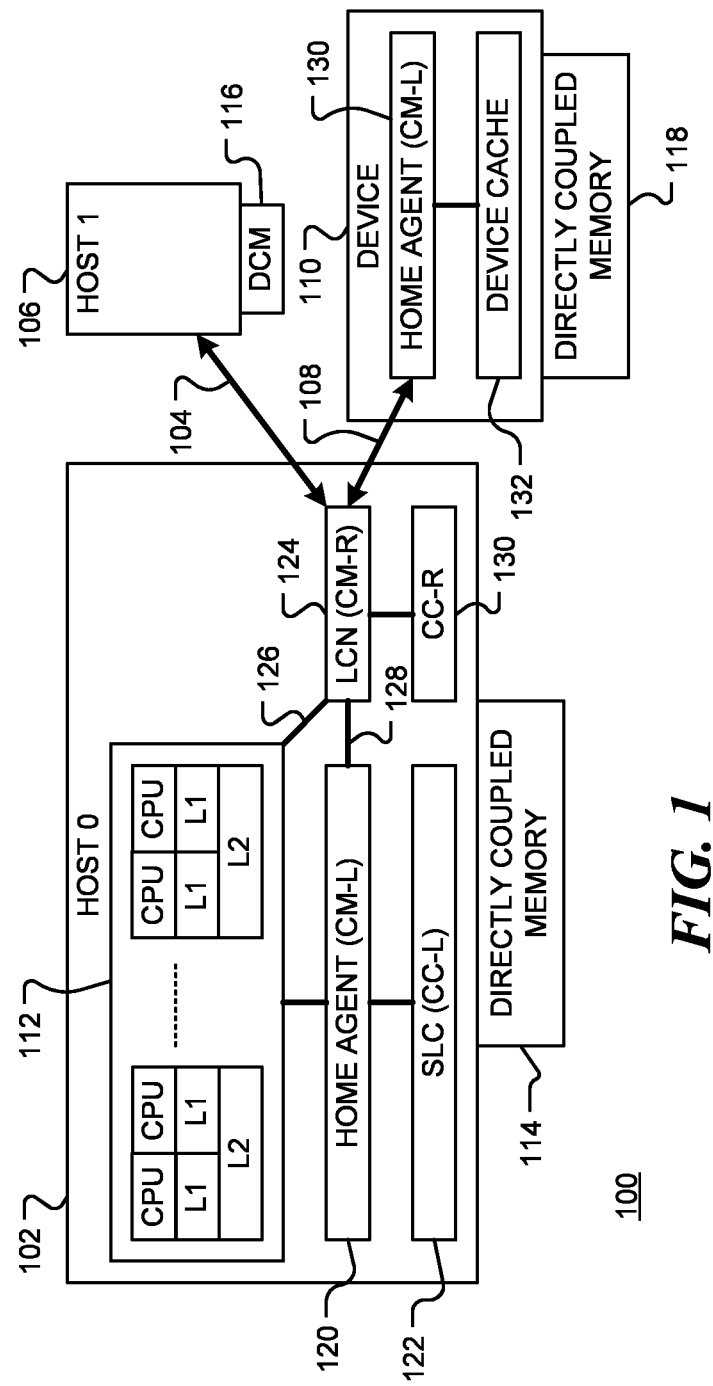
FIG. 1 is a simplified block diagram of a multi-chip data processing system, in accordance with representative embodiments.

The various apparatus and devices described herein provide mechanisms for cache coherence management in multi-chip and multi-block data processing networks.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

FIG. 1 is a simplified block diagram of a multi-chip data processing system 100, in accordance with embodiments of the disclosure. First host chip 102 (HOST 0) is coupled via symmetric link 104 to second host chip 106 (HOST 1) and via link 108 to device chip 110. Host chip 102 includes a number of requesting and local caching agents 112, such as central processing cores with core private level one (LI) caches and cluster private level two (L2) caches. These may be coupled by a coherent mesh network, for example. The processing cores access local directly coupled memory 114, which may be located on-chip, off-chip, or both. The processing cores may also access remote memory 116 directly coupled to second host chip 106 and remote memory 118 directly coupled to device chip 110. Herein, the term "memory" refers to any computer readable medium, including but not limited to volatile, non-volatile and persistent memories.

Cache coherency for data mapped to local directly coupled memory 114 is maintained by local home agent 120. Home agent 120 is a cache manager (CM-L) for data mapped to local memory 114. Home agent 120 may also manage system level cache (SLC) 122 that is a coherent cache (CC-L) for data mapped to local memory 114. Home agent 120 includes a snoop filter that tracks local data accessed by both local caching agents remote caching agent (such as host 106 and device 110).

Local Coherency Node (LCN) 124 is a cache manager (CM-R) for data mapped to remote memory 118 when that data is accessed by local caching agents. In one embodiment, requests for remote memory access for local requesting agents are received at first interface 126, while requests for local memory access are passed to home agent 120. In a further embodiment, requests for both local and remote memory access are received at first interface 126 and requests for local memory access are forwarded, via interface 128, to home agent 120. LCN 124 may also manage coherent cache (CC-R) 130 that caches data mapped to remote memory 118. LCN 124 includes a snoop filter that tracks remote data accessed by local caching agents 112.

Device 110 includes its own home agent 130 that manages coherency for local caching agents.

While FIG. 1 shows only a single device chip and two host chips, a large-scale data processing system may contain many caching agents across multiple chips. Data and instruction coherency may be maintained across all the caching agents using multiple levels of cache and snoop filter hierarchy. A snoop filter tracks the cache lines accessed by each caching agent so that any subsequent access to this address by another caching agent can be easily looked up for coherency resolution. In a hierarchical system, each level of the cache/snoop filter hierarchy acts as an aggregation layer for the caches before it. For example, multiple private level one (L1) data and instruction caches are tracked at the shared level two (L2) snoop filter. If an L2 cache is private to each agent, then the tracking is done at shared level three (L3) snoop filter and so on. At the level of the system level cache (SLC), the snoop filter tracks all the cache lines in the L3 or last level cache (L3/LLC) and above. (Herein, L1 is taken to be the highest level).

When scaling to large multi-chip systems with lots of caching agents, it becomes challenging to track multiple caching agents for each cache line entry in the snoop filter. This tracking is done using a unique, multi-bit device identifier (ID) or a logical ID indirection for each caching agent. For example, in a system with 512 caching agents being tracked at the next shared level, it is not practical to store each caching agent's identifier in each cache line entry. Even with a logical ID indirection for each caching agent, a 512-bit presence vector is required for each cache line.

TABLE 1 shows example entries in an example snoop filter table. Each entry has an address tag, a current coherency state of the cache line and a presence vector for each caching agent. The presence vector is a logical ID bit vector, with each bit position corresponding to a caching agent. The coherence state is one of Modified (M), Exclusive (E), Shared (S) or Invalid (I).

TABLE 1

Snoop filter table contents for 512 agent tracking.

| Cache Line Address Tag | Current Coherency State (MESI) | Caching agent presence vector | | | | |
|---|---|---|---|---|---|---|
| 0xA | Shared | 511 | . | . . | 1 | 0 |
| 0xB | Unique | 511 | . | . . | 1 | 0 |

Snoop filter clustering has been implemented to reduce the size of a snoop filter presence. However, snoop filter clustering can lead to imprecise tracking of caching agents and thus performance drop such as exclusive handling and unnecessary snoops.

In a flat homogeneous system, coherent requests are sent to the home node that is the point-of-coherency (PoC) for the data. This can be inefficient for local sharing of remote cache lines—i.e., cache lines mapped to remote memory. For example, when one caching agent requests a shared copy of a remote cache line, the coherent read message and the data transfer must both cross the chip-to-chip link. This introduces a large latency, even when a shared copy of the cache line exists in peer caching agents on the same chip.

Referring again to FIG. 1, standalone LCN 124 and home agent 120 can be configured in series using link 128. For example, with requests being directed to LCN 124 and forwarded to home agent 120 as needed. However, this adds an additional caching layer that can lead to longer latency when caching agents access local memory 114.

Alternatively, a standalone LCN can be used for remote memory accesses only. Link 128 is not implemented and so latency of accesses to local memory 114 is not impacted. However, a standalone LCN device can still introduce unnecessary snoop filter overhead, since the LCN snoop filter is not used at all when all caching agents only access local memory 114.

In accordance with embodiments of the disclosure, the home agent and the LCN are combined as a Super Home Node (HNS). This still allows one level of caching for local memory and access of local memory is not impacted compared with an inline LCN. In addition, the combination allows both local and remote traffic to efficiently utilize shared hardware resources.

Figure 2:
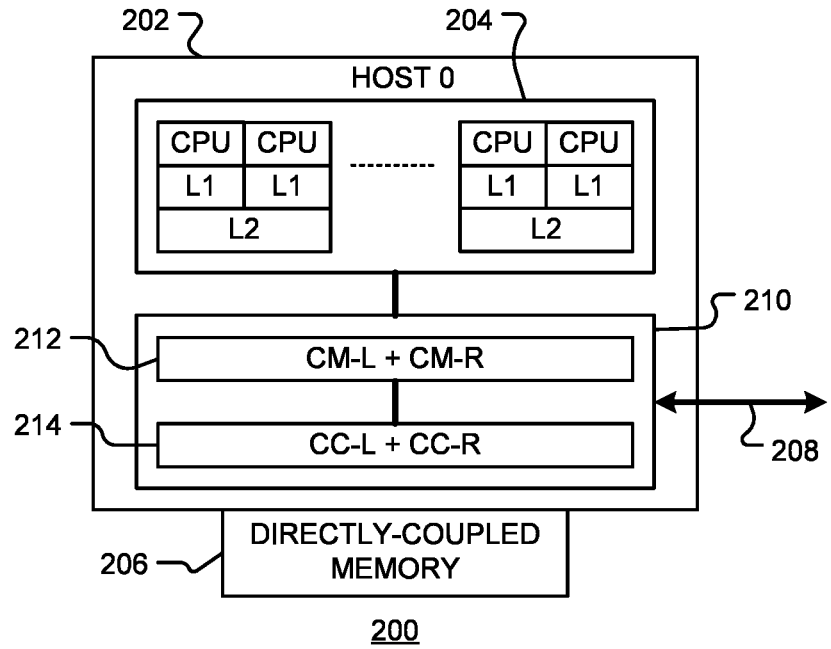
FIG. 2 is a block diagram of a data processing apparatus, in accordance with various representative embodiments.

FIG. 2 is a block diagram of a data processing apparatus 200 in accordance with various representative embodiments. First integrated circuit or chip 202 includes a number of requesting and caching agents 204, such as central processing cores with core private level one (L1) caches and cluster private level two (L2) caches. These may be coupled by a coherent mesh network, for example. The processing cores access local directly coupled memory 206, which may be located on-chip, off-chip, or both. The processing cores may also access one or more remote memories directly coupled to one or more second integrated circuits via chip-to-chip gateway 208. The one or more second integrated circuits may include another processing circuit, an accelerator circuit, a cache or memory, for example.

The one or more second integrated circuits may include circuits on two or more integrated circuit dies (chiplets) within the same package.

In accordance with embodiments of disclosure, apparatus 200 includes Super Home Node (HNS) 210. HNS 210 includes a coherence manager 212 that manages local coherency and cached data for data mapped to addresses in a remote memory and also manages coherency of multiple chips for data mapped to addresses in local memory 206. Thus, HNS 210 combines the functionality of a Local Coherency Node (LCN). HNS 210 acts as a home node for a range of data addresses in local memory 206 and manages system cache coherency across multiple chips. HNS 210 also acts as a local coherence node (LCN) for data address in a memory device coupled to, or located, in one or more remote integrated circuits.

HNS 210 also includes data cache 214 that caches data lines from both local memory 206 and one or more remote memories.

HNS 210 has the properties:
 Each remote integrated circuit or chip presents as a single caching agent, which simplifies scaling for multi-chip systems.
 Cache coherency of remote addresses is managed locally, without always going off chip to a remote home node.
 HNS 210 provides another hierarchy of caching for remote lines, while local memory latency is not impacted.
 HNS 210 allows different flexible topologies and system configurations, such as an input/output (I/O) hub and Type 1 and 2 devices defined in the Compute Express Link™ (CXL™) protocol of Compute Express Link Consortium, Inc.

An advantage of a Super Home Node is scalability. A hierarchical HNS allows each remote integrated circuit to present as a single caching agent. This avoids the need for snoop filter tracking of all caching agents on remote chips. Hence, it can be scaled to large, multi-chip systems.

For example, in a 4-chip system where there are 128 caching agents on each chip, a 512-bit snoop filter presence vector is required for precise tracking in a flat system (as shown in TABLE 1, above). In contrast, in hierarchical system with a HNS, the presence vector uses 128 bits for local caching agents and 3 bits for the remote chips, for a total of 131 bits. For the remote chips, a designated bit in the presence vector is set when the cache line exists in at least one cache of the remote chip. TABLE 2 shows example snoop filter table entries in a hierarchical super home node. Each entry includes a tracking or presence vector.

TABLE 2

Snoop filter table for clustered agent tracking.

| Cache Line Address | Current State (MESI) | Cluster ID presence vector | | | | |
|---|---|---|---|---|---|---|
| 0xA | Shared | 130 | . | . . | 1 | 0 |
| 0xB | Unique | 130 | . | . . | 1 | 0 |

Bits 0-127 each correspond to a single local caching agent, bits 128-130 each correspond to a remote chip. For each local caching agent, the presence vector indicates when the cache line is present at that caching agent. For each remote integrated circuit, the presence vector indicates when the cache line is present at any caching agent of that integrated circuit.

In a flat system, the home agent implements snoop filter clustering that groups multiple caching agents into one cluster. In the same system above with four caching agents in each cluster, snoop filter needs a 128-bit presence vector.

Any access to a cache line will snoop all four agents in this cluster if any one of them had accessed it. In addition, more snoops are sent across the chip-to-chip link if multiple clusters share the cache line. In contrast, with the hierarchical HNS of the present disclosure, only a single snoop is sent to the remote chip.

A hierarchical HNS allows cache coherency of remote addresses to be managed locally, eliminating the need to always communicate with the home node of the remote chip. For addresses mapped to a remote memory, the HNS is a caching agent and tracks the MESI coherence state. If an early access gets chip ownership for a cache line mapped to a remote address, then the HNS, acting as an LCN, becomes the point-of-coherency (PoC) and ownership requests can be handled within the chip. For local sharing, when one caching agent requests a shared copy of a remote address, a coherent read for the address is sent to the HNS acting as an LCN. The HNS can either return data that is cached in the local coherent cache or send a forward snoop to a peer caching agent.

By adding another cache hierarchy in the system, the HNS improves latency of remote memory access significantly, compared with a flat system. When caching agents access local memory, the HNS still provides one-level of caching in the SLC. Thus, the HNS improves remote memory access performance without sacrificing local memory access performance.

In summary, various embodiments of the disclosure provide a data processing apparatus having multiple caching agents in a first integrated circuit. A chip-to-chip gateway is configured to couple between the first integrated circuit and a second integrated circuit. A snoop filter table of the first integrated circuit is configured to store entries associated with cache lines. Each entry includes a presence vector, a coherency state of the cache line, and an address tag of the cache line. For each caching agent of the first integrated circuit, the presence vector indicates when the cache line is present at that specific caching agent. For a second integrated circuit, the presence vector indicates when the cache line is present at any caching agent of the second integrated circuit. The snoop filter table is included in a snoop filter that filters transaction requests for the cache line, where the filtering is based on the presence vector of a stored entry associated with the cache line. A caching agent of the first or second integrated circuit may include a cluster of one or more processors and one or more caches, for example.

Figure 3:
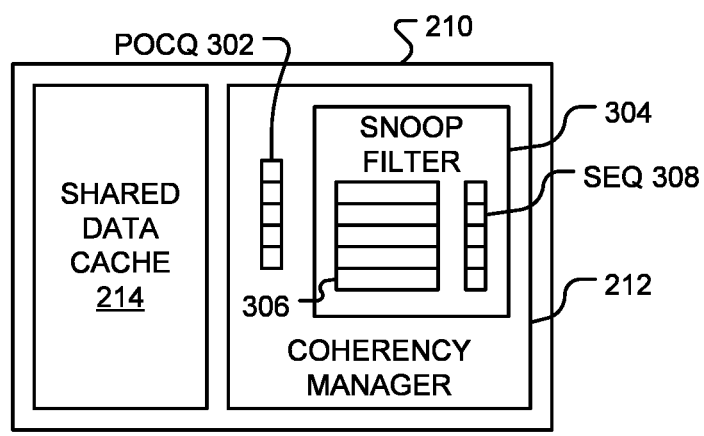
FIG. 3 is a block diagram of a hierarchical super home node, in accordance with various representative embodiments.

FIG. 3 is a block diagram of a hierarchical HNS 210, in accordance with various representative embodiments. Local and remote memory accesses use shared hardware resources with low overhead. In addition, reservations are used in each hardware resources to avoid deadlocks. HNS 210 includes shared coherence manager 212 and shared data cache 214. Shared coherence manager 212 includes point-of-coherency queue (POCQ) 302 and shared snoop filter and snoop filter eviction queue (SEQ) 304.

Shared data cache 214 provides caching for (a) cache lines mapped to local memory and requested by local or remote agents, and (b) cache lines mapped to remote memory when these lines have been requested by a local requesting/caching agent. In one embodiment, the HNS implements dynamic portion-based partitioning between cache lines mapped to local memory and cache lines mapped to remote memory. This provides more efficient cache utilization when local and remote mapped cache lines compete for cache resources. In addition, the HNS can implement an eviction policy that selects victim cache line to avoid victim oscillations, where a remote mapped line evicted from one HNS is allocated to a local partition of a remote HNS and triggers an eviction there.

POCQ 302 is a shared point-of-coherency queue. It is configured to store transaction requests for data in a memory coupled to, or located in, the first integrated circuit and transaction requests for data in a memory coupled to, or located, in one or more second integrated circuits. Both transactions that access local memory and transactions that access remote memory can be allocated in the shared POCQ. POCQ 302 may be configured to allow class-based partitions, such as Quality of Service (QOS) classes, so transactions can use QoS override to provide flexible POCQ utilization. At least one POCQ entry is reserved for transactions from come from a remote chip to access local memory. This avoids cross-dependency deadlock. In an embodiment, space in the POCQ is dynamically allocated between transaction requests for data in the memory coupled to, or located in, a first integrated circuit and transaction requests for data in the memory coupled to, or located in, one or more second integrated circuits.

Snoop filter and snoop filter eviction queue 304 are shared for both local and remote mapped addresses and enable tracking of caching agents. To avoid deadlock, at least a portion of the snoop filter table is reserved for local mapped addresses. For example, when the snoop filter table is implemented as a set associative cache, one way in each cache set may be reserved for local mapped addresses. In addition, at least one entry in the snoop filter eviction queue is reserved for local mapped addresses.

Figure 4:
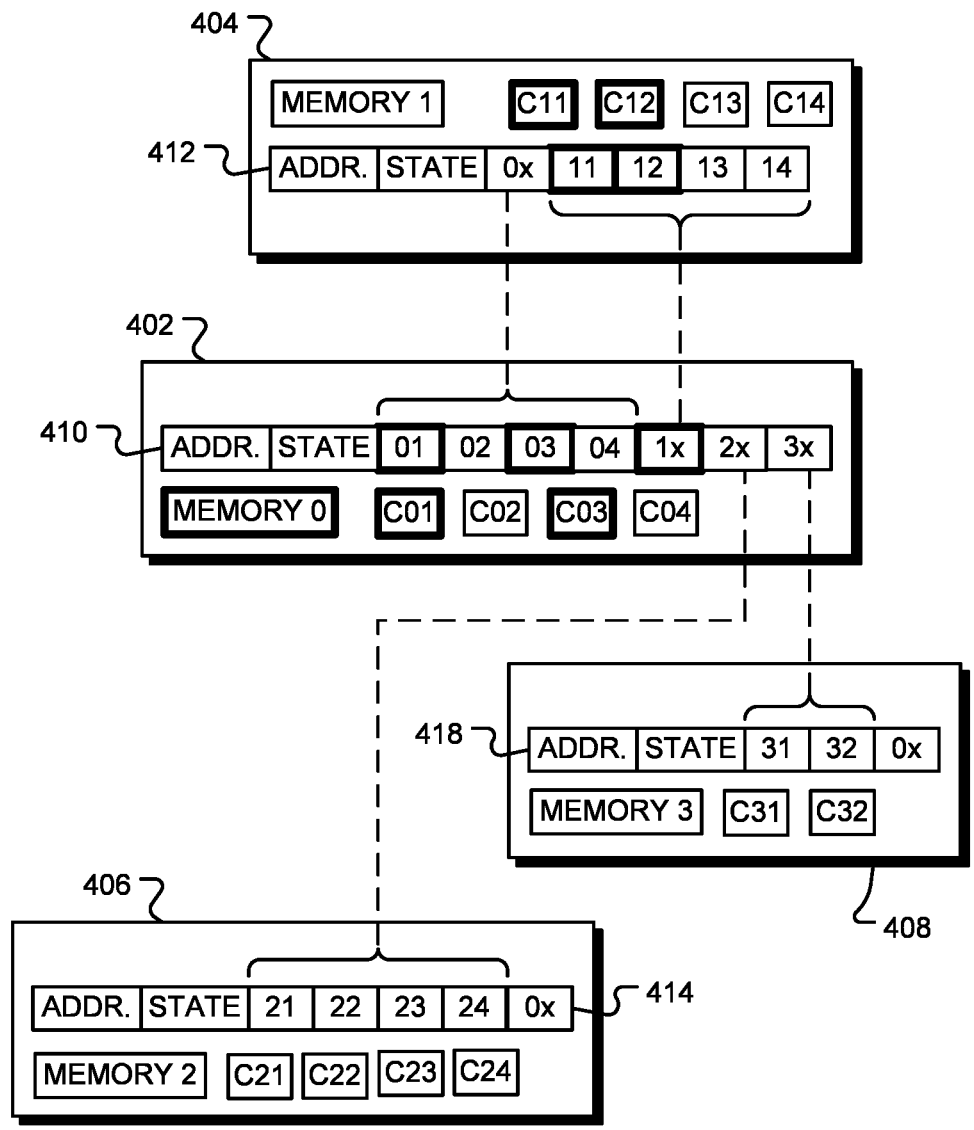
FIGS. 4 and 5 are diagrammatic representations of a snoop filter hierarchy, in accordance with various representative embodiments.

FIG. 4 is a diagrammatic representation of a snoop filter hierarchy 400, in accordance with various representative embodiments. In the simple example shown, snoop filter hierarchy 400 includes snoop filters on integrated circuits 402, 404, 406 and 408. Integrated circuit 402 has a directly coupled memory, denoted as MEMORY 0, and four local caching agents, denoted C01, C02, C03 and C04. A single entry 410 in the snoop filter table of integrated circuit 402 is shown. In practice, the cache can contain multiple entries. Entry 410 includes an address tag field, a coherence state field and a presence vector. The presence vector has one bit, denoted 01, 02, 03 and 04, for each local caching agent and one bit, denoted 1x, 2x and 3x, for each of the three remote chips to which it is coupled. Similarly, chip 404 has a directly coupled memory, denoted as MEMORY 1, and four local caching agents denoted C11, C12, C13 and C14. The presence vector in snoop filter entry 412 has one bit, denoted 11, 12, 13 and 14, for each local caching agent and one bit, denoted Ox for caches on chip 402, to which it is coupled. Chip 406 has a directly coupled memory, denoted as MEMORY 2, and four local caching agents denoted C21, C22, C23 and C24. The presence vector in snoop filter entry 414 has one bit, denoted 21, 22, 23 and 24, for each local caching agent and one bit, denoted 0x, for caching agents on chip 402, to which it is coupled. Chip 408 has a directly coupled memory, denoted as MEMORY 3, and two local caching agents denoted C31 and C32. The presence vector in snoop filter entry 416 has one bit, denoted 31 and 32, for each local caching agent and one bit, denoted Ox, for caching agents on chip 402, to which it is coupled.

When a cache line is transferred to a local caching agent, the presence vector in an entry of the local snoop filter table is updated to indicate presence of the cache line at that caching agent. When the cache line is transferred to any caching agent of a remote integrated circuit, the presence vector in the entry of the local snoop filter table is updated to indicate presence of the cache line at a caching agent of the remote integrated circuit. All caching agents of the second integrated circuit are represented as a single caching agent in the presence vector.

In the example shown, MEMORY 0 has been accessed by caching agents C01 and C03 on chip 402 and by caching agents C11 and C12 on chip 404, as indicated by the bold highlighting in FIG. 4. Accordingly, bits 01 and 03 in the presence vector of chip 402 are set to indicate the presence of the data at local caching agents, and bit 1x is set to indicate the presence of the data at one or more caching agents of chip 404. In addition, bits 11 and 12 in the presence vector of chip 404 are set to indicate the presence of the data at the corresponding local caching agents.

When a request for data of the cache line is received, local caching agents are selected based on the presence vector in the snoop filter table for the cache line, and snoop requests for the cache line are transmitted to the selected local caching agents. In addition, a snoop request for the cache line is transmitted, via a chip-to-chip gateway, to any remote integrated circuit when the presence vector in the snoop filter table for the cache line indicates presence of the cache line at a caching agent of that remote integrated circuit.

Figure 5:
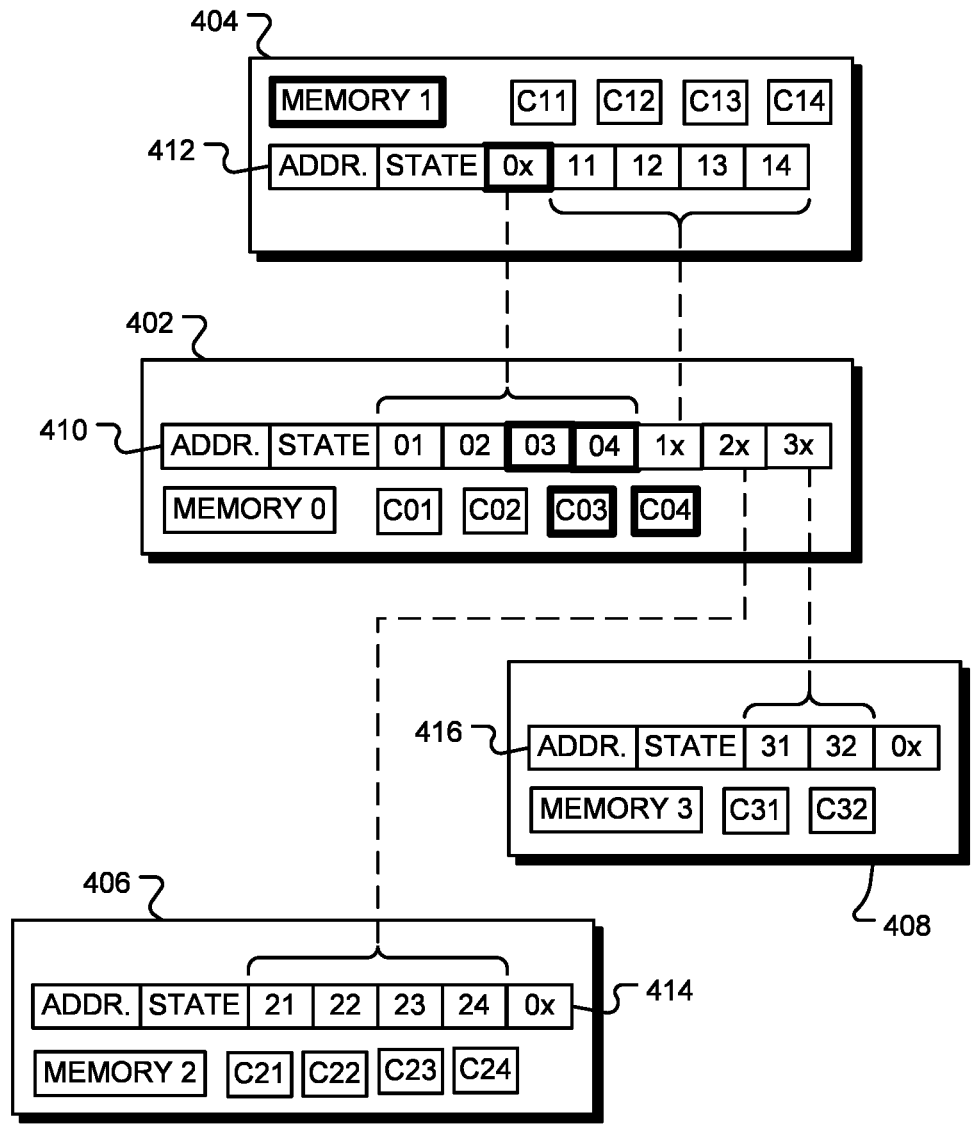

FIG. 5 shows the same snoop filter hierarchy as shown in FIG. 4. In the example shown in FIG. 5, MEMORY 1 has been accessed by caching agents C03 and C04 on chip 402, as indicated by the bold highlighting in FIG. 5. Accordingly, bits 03 and 04 in the presence vector of chip 402 are set to indicate the presence of the data at local caching agents, and bit Ox is set in the presence vector of chip 404 to indicate the presence of the data at one or more caching agents on chip 402.

In this manner, a shared snoop filter is used to track cached data for both local-mapped and remote-mapped addresses. The presence vector in snoop filter entry 410 uses only 7 bits but tracks coherence for 14 tracking agents. When implemented in a large-scale data processing system, the hierarchical tracking system results in a much smaller memory requirement than a flat tracking system.

Figure 6:
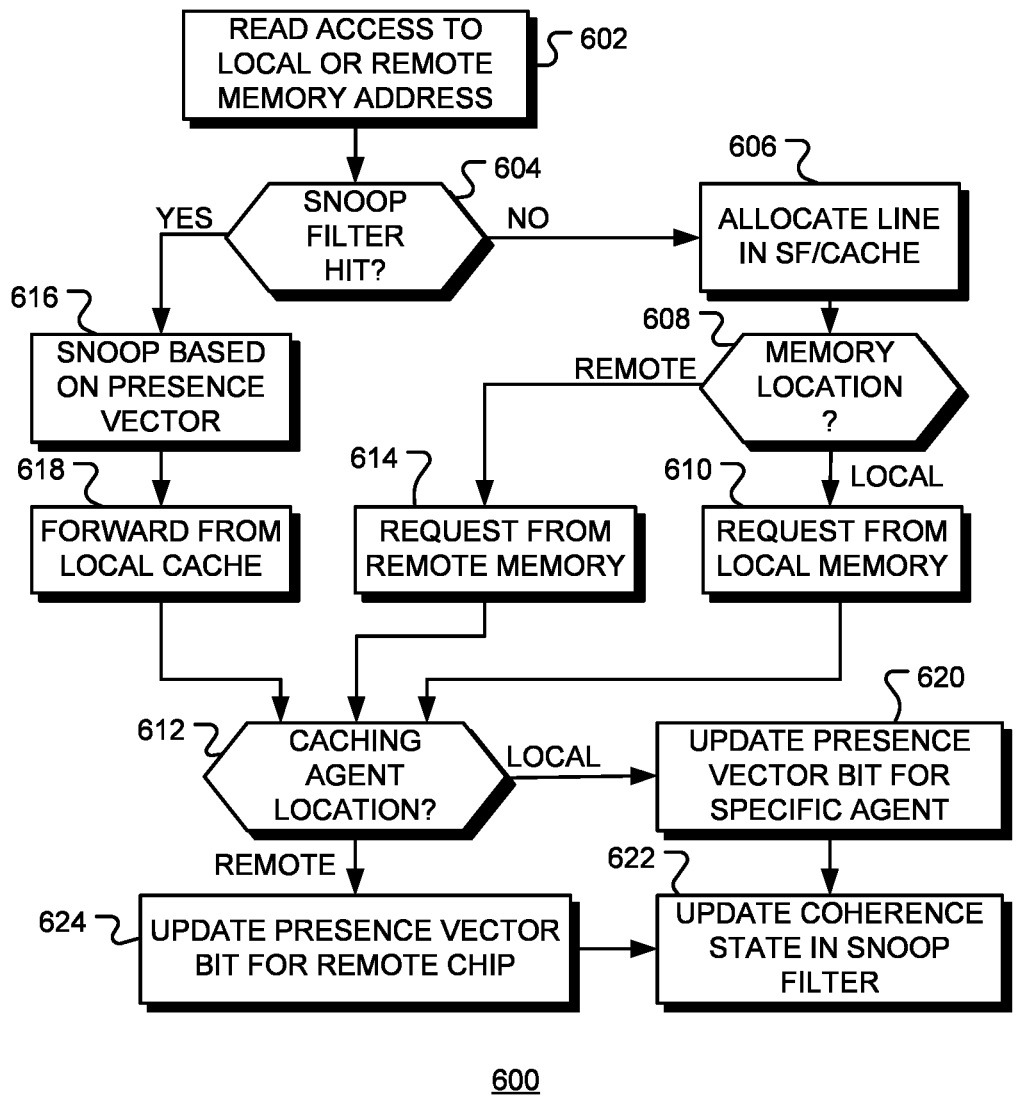
FIG. 6 is a flow chart of a method of coherence management, in accordance with various representative embodiments.

FIG. 6 is a flow chart of a method 600 of coherence management, in accordance with various representative embodiments. At block 602, a read access data mapped to an address in local or remote memory is received at a coherence manager. If the address does not match any entry in the snoop filter table of the coherence manager, as depicted by the negative branch from decision block 604, a line is allocated in the snoop table at block 606. When the address is mapped to local memory, as depicted by the "LOCAL" branch from decision block 608, a cache line is requested from local memory at block 610, and flow continues to block 612. Otherwise, when the address is mapped to remote memory, as depicted by the "REMOTE" branch from decision block 608, a cache line is requested from remote memory at block 614, and flow continues to block 612.

When the address matches an entry in the snoop filter table of the coherence manager, i.e., the address "hits" in the snoop, as depicted by the positive branch from decision block 604, snoop requests are sent out, at block 616, based on the contents of the presence vector. In particular, if a bit corresponding to a local caching agent is set, a snoop request is sent to that agent. If a bit corresponding to a remote chip is set, a snoop request is sent to a home agent on that chip. The home agent forwards the snoop requests to local caching agents, based on its own snoop filter table. A cache line containing requested data is forwarded to the requester from a local cache at block 618, and flow continues to block 612.

When the cache line containing the requested data is sent to a caching agent of the local chip, as depicted by the "LOCAL" branch from decision block 612, a specific bit in the presence vector of the snoop filter table entry is set, at block 620, to indicate presence of the cache line at that location. The coherence state of the cache is updated in the snoop filter table entry at block 622.

When the cache line containing the requested data is sent to a remote local caching agent, as depicted by the "REMOTE" branch from decision block 612, a bit in the presence vector of the snoop filter table entry is set, at block 624, to indicate presence of the cache line at one or more caching agents of the remote chip. All remote caching agents are represented as a single (proxy) caching agent in the presence vector. Flow continues to block 622, where the coherence state of the cache is updated in the snoop filter table entry.

The HNS of the present disclosure enables cache coherency in a multi-chip data processing system to be managed locally when multiple caching agents simultaneously access remote addresses. It also provides scalability for multi-chip systems. In addition, the HNS can be used in different topologies and system configurations.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative memories should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added, or operations can be deleted, without departing from the present disclosure. Such variations are contemplated and considered equivalent.

The embodiments described herein are combinable.

A data processing apparatus having a plurality of caching agents of a first integrated circuit; and a device coupled to the plurality of caching agents and configured to store a plurality of entries, each entry associated with a cache line and including a presence vector indicating for each caching agent of the first integrated circuit, when the cache line is present at the caching agent, and for each second integrated circuit of one or more second integrated circuits, when the cache line is present at any caching agent of the second integrated circuit.

In another embodiment, the data processing apparatus where the device is included in a snoop filter to filter transaction requests for the cache line, where the filtering is based on the presence vector of a stored entry associated with the cache line.

In another embodiment, the data processing apparatus further having a chip-to-chip gateway configured to couple between the first integrated circuit and a second integrated circuit of the one or more second integrated circuits.

In a further embodiment, the data processing apparatus where each entry further indicates a coherency state of the cache line and an address tag of the cache line.

In another embodiment, the data processing apparatus where a caching agent of the first integrated circuit or of a second integrated circuit of the one or more second integrated circuits includes a cluster of one or more processors and one or more caches.

In another embodiment, the data processing apparatus where a second integrated circuit of the one or more second integrated circuits includes, or is coupled to, a memory.

In a further embodiment, the data processing apparatus further having a point-of-coherency queue configured to store transaction requests for data in a memory coupled to, or located in, the first integrated circuit and transaction requests for data in a memory coupled to, or located, in the one or more second integrated circuits.

In another embodiment, the data processing apparatus where space in the point-of-coherency queue is dynamically allocated between transaction requests for data in the memory coupled to, or located in, the first integrated circuit and transaction requests for data in the memory coupled to, or located in, a second integrated circuit of the one or more second integrated circuits.

In another embodiment, the data processing apparatus further having a cache configured to store cache lines requested from a memory coupled to, or located in, the first integrated circuit and cache lines requested from a memory coupled to, or located in, a second integrated circuit of the one or more second integrated circuits.

In a further embodiment, the data processing apparatus where the device is configured as a home node for a range of data addresses in a memory coupled to, or located in, the first integrated circuit and a local coherence node for data addresses in a memory coupled to, or located, in a second integrated circuit of the one or more second integrated circuits.

In another embodiment, a data processing apparatus having a plurality of local caching agents of a first chip and a coherence manager configured to manage coherence for local cache lines of the first chip and remote cache lines of a second chip when accessed by one or more local caching agents and local cache lines accessed by caching agents of one or more second chips, where the coherence manager includes a shared point-of-coherency queue for transaction requests from the first chip and the second chip, a shared cache for both local and remote cache lines accessed by a local caching agent and a snoop filter table, when an entry in a snoop filter table includes a presence vector that indicates the presence of a remote cache line at specific caching agents of the first chip, or the presence of a local cache line at specific caching agents of the first chip and any caching agent of the second chip.

In another embodiment, the data processing apparatus further having a snoop filter configured to filter transaction requests for a cache line, where the filtering is based on the presence vector in the snoop filter table entry associated with the cache line.

In a further embodiment, a method having, responsive to transference of a cache line to a caching agent of a first integrated circuit, updating a presence vector in an entry of a snoop filter table of the first integrated circuit to indicate presence of the cache line at that caching agent and responsive to transference of the cache line to a caching agent of a second integrated circuit, updating the presence vector in the entry of the snoop filter table of the first integrated circuit to indicate presence of the cache line at a caching agent of the second integrated circuit, where a plurality of caching agents of the second integrated circuit present as a single caching agent in the presence vector.

In another embodiment, the method further having, responsive to receiving a request for data in the cache line, selecting caching agents of the first integrated circuit based on the presence vector in the snoop filter table for the cache line, transmitting snoop requests for the cache line to the selected caching agents of the first integrated circuit and when the presence vector in the snoop filter table for the cache line indicates presence of the cache line at a caching agent of the second integrated circuit, transmitting a snoop request for the cache line, via a chip-to-chip gateway, to the second integrated circuit.

In another embodiment, the method further having storing transaction requests for data in a memory coupled to, or located in, the first integrated circuit in a point-of-coherency queue of the first integrated circuit and storing transaction requests for data in a memory coupled to, or located in, the second integrated circuit in the point-of-coherency queue of the first integrated circuit.

In a further embodiment, the method further having dynamically allocating space in the point-of-coherency queue between transaction requests for data in the memory coupled to, or located in, the first integrated circuit and transaction requests for data in the memory coupled to, or located in, the second integrated circuit.

In another embodiment, the method further having reserving at least one entry in the point-of-coherency queue for transaction requests for data in the memory coupled to, or located in, the first integrated circuit.

In another embodiment, the method further having maintaining data coherency for a range of data addresses in a memory coupled to, or located in, the first integrated circuit and data address in a memory coupled to, or located, in the second integrated circuit.

In a further embodiment, the method further having storing cache lines requested from a memory coupled to, or located in, the first or second integrated circuit in a cache of the first integrated circuit.

In another embodiment, the method further having reserving space in the snoop filter table cache lines mapped to a memory coupled to, or located in, the first integrated circuit.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A data processing apparatus comprising:
   a coherence manager, of a first integrated circuit, configured to manage cache lines mapped to addresses in a first memory coupled to or located in the first integrated circuit, or mapped to addresses in one or more second memories, each second memory coupled to or located in a second integrated circuit of one or more second integrated circuits;
   where the coherence manager is further configured to store a plurality of entries in a snoop filter table, each entry in the snoop filter table associated with a cache line and including a presence vector including:
   one or more first bits, each first bit designated as corresponding to a specific caching agent of a plurality of caching agents of the first integrated circuit, each first bit indicating when the cache line is present at the specific caching agent; and
   one or more second bits, each second bit designated as corresponding to a specific second integrated circuit of the one or more second integrated circuits, each second bit indicating when the cache line is mapped to an address in the first memory and is present at any caching agent of a plurality of caching agents of the specific second integrated circuit.

2. The data processing apparatus of claim 1, where the coherence manager includes a snoop filter to filter transaction requests for the cache line, where the filtering is based on the presence vector of a stored entry associated with the cache line.

3. The data processing apparatus of claim 1, further comprising a chip-to-chip gateway configured to couple between the first integrated circuit and a second integrated circuit of the one or more second integrated circuits.

4. The data processing apparatus of claim 1, where each entry further indicates:
   a coherency state of the cache line; and
   an address tag of the cache line.

5. The data processing apparatus of claim 1, further comprising:
   the plurality of caching agents of the first integrated circuit;
   where a caching agent of the plurality of caching agents of the first integrated circuit includes a cluster of one or more processors and one or more caches.

6. The data processing apparatus of claim 1, further comprising:
   the first integrated circuit and the one or more second integrated circuits.

7. The data processing apparatus of claim 1, further comprising:
   a point-of-coherency queue configured to store:
      transaction requests for data in a memory coupled to, or located in, the first integrated circuit; and
      transaction requests for data in a memory coupled to, or located, in the one or more second integrated circuits.

8. The data processing apparatus of claim 7, where space in the point-of-coherency queue is dynamically allocated between transaction requests for data in the memory coupled to, or located in, the first integrated circuit and transaction requests for data in the memory coupled to, or located in, a second integrated circuit of the one or more second integrated circuits.

9. The data processing apparatus of claim 1, further comprising a cache configured to store:
   cache lines requested from a memory coupled to, or located in, the first integrated circuit; and
   cache lines requested from a memory coupled to, or located in, a second integrated circuit of the one or more second integrated circuits.

10. The data processing apparatus of claim 1, where the coherence manager is configured as:
    a home node for a range of data addresses in a memory coupled to, or located in, the first integrated circuit; and
    a local coherence node for data addresses in a memory coupled to, or located, in a second integrated circuit of the one or more second integrated circuits.

* * * * *